United States Patent [19]

Masterton

[11] Patent Number: 4,864,195

[45] Date of Patent: Sep. 5, 1989

[54] COLOR DISPLAY SYSTEM WITH DYNAMICALLY VARIED BEAM SPACING

[75] Inventor: Walter D. Masterton, Manheim Township, Lancaster County, Pa.

[73] Assignee: RCA Licensing Corp., Princeton, N.J.

[21] Appl. No.: 190,613

[22] Filed: May 5, 1988

[51] Int. Cl.$^4$ .............................................. H01J 29/56
[52] U.S. Cl. ................................... 315/371; 315/368
[58] Field of Search ................................ 315/371, 368

[56] References Cited

U.S. PATENT DOCUMENTS

| | | | |
|---|---|---|---|
| 2,907,915 | 10/1959 | Gleichauf | 315/13 |
| 2,923,844 | 2/1960 | Gundert | 313/70 |
| 3,430,099 | 2/1969 | Ashley | 315/27 |
| 3,553,523 | 1/1971 | Budd | 315/13 |
| 4,136,300 | 1/1979 | Morrell | 313/403 |
| 4,214,188 | 7/1980 | Bafaro et al. | 315/382 |
| 4,258,298 | 3/1981 | Hilburn et al. | 315/382 |
| 4,316,128 | 2/1982 | Shiratsuchi | 315/411 |

*Primary Examiner*—Theodore M. Blum
*Attorney, Agent, or Firm*—J. S. Tripoli; D. H. Irlbeck

[57] ABSTRACT

The improved color display system includes a cathode-ray tube and a magnetic deflection yoke positioned on the tube. The tube includes a faceplate having a phosphor screen thereon; a shadow mask adjacent to said screen; and an electron gun for generating three electron beams, a center and two side beams, and directing the beams along paths through the yoke toward the mask and screen. The yoke forms a magnetic deflection field for scanning the electron beams vertically and in horizontal lines across the screen. The improvement comprises the combination of two features. First, the mask has greater curvature than the faceplate, with the spacing between the mask and screen increasing from the center to the sides of the mask in the horizontal scan direction. Second, means are included for dynamically varying the spacing between the side beams and the center beam in inverse relation to the variation in mask-to-screen spacing during each horizontal scan line of the electron beams.

5 Claims, 5 Drawing Sheets

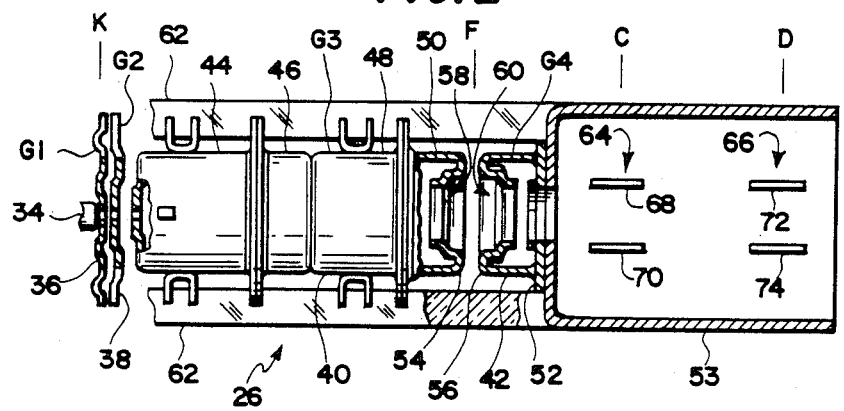
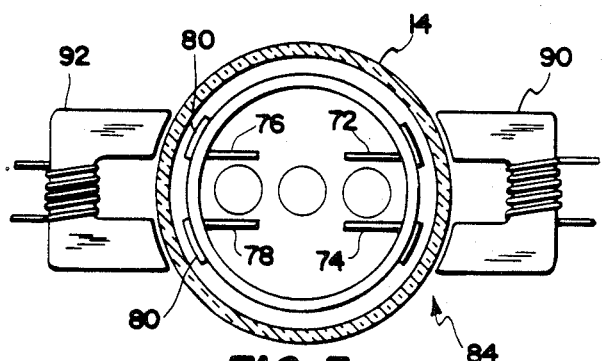
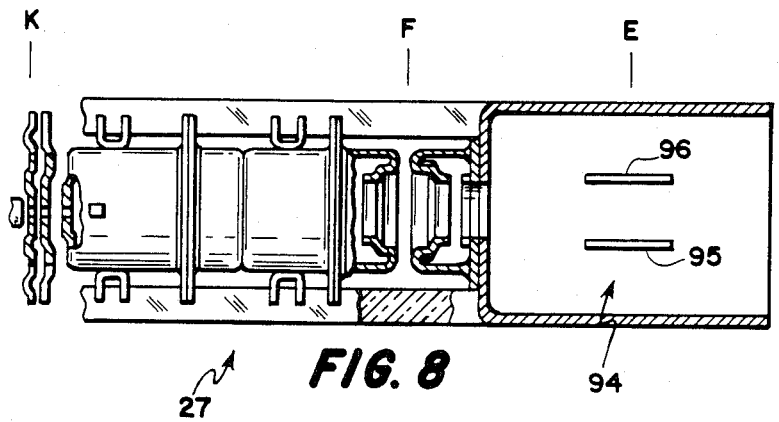

COLOR DISPLAY SYSTEM WITH DYNAMICALLY VARIED BEAM SPACING

The present invention relates to a color display system including a cathode-ray tube having a three beam electron gun, and particularly to such a system wherein the spacing between electron beams at a deflection plane is dynamically varied.

BACKGROUND OF THE INVENTION

In a shadow mask type cathode-ray tube for producing a color image, a plurality of convergent electron beams are projected through a multi-apertured color selection shadow mask to a cathodoluminescent screen. The beam paths through the mask are such that each beam impinges upon and excites only one kind of color-emitting phosphor element on the screen. Generally, the shadow mask is attached to a rigid peripheral frame, which, in turn, is suspended within the tube envelope.

When a color cathode-ray tube is operated, the electrons that strike the shadow mask cause it to heat up. Since the periphery of the shadow mask is attached to a somewhat heavy frame, the frame acts as a heat sink, and a temperature differential develops between the center and peripheral portions of the mask. Because of the temperature differentials, the mask center, the mask periphery and the frame expand at different rates. This difference in expansion rates causes a doming of certain portions of the mask toward the screen. In the center of the screen, doming causes little effect on the register between the electron beams and phosphor elements, because the straight line projection of the beams to the elements remains unchanged with changes in mask-to-screen spacing. Since the periphery of the mask is fixed to a frame, there is no doming at the mask periphery. Therefore, maximum misregister caused by doming occurs approximately halfway between the mask center and the mask periphery. Misregister is defined as being the amount an electron beam is off-center from its respective phosphor element. Because of doming, the electron beams passing through the mask misregister with the phosphor elements of the screen. The misregister effect of doming peaks after 3 to 5 minutes of initial tube operation, but continues to have a diminishing effect on tube performance for an additional 10 to 15 minutes Once the tube temperatures reach steady state, electron beam misregister caused by expansion of the mask is corrected by temperature-sensitive frame supports which move the mask-frame assembly toward the screen.

A partial solution to the doming problem was disclosed in U.S. Pat. No. 4,136,300, issued to A. M. Morrell on Jan. 23, 1979. The Morrell patent teaches that, if a shadow mask is given greater curvature than that suggested by the prior art, the effects of doming are reduced. In order to maintain proper spacings of phosphor screen lines, the Morrell patent teaches that the horizontal spacing between the shadow mask aperture columns should be varied approximately according to the equation, $q = La/3s$, where: "q" is the mask-to-screen spacing, "L" is the distance from the deflection plane to the screen, "a" is the center-to-center spacing between aperture columns, and "s" is the center-to-center beam spacing at the plane of deflection.

There may be situations where it is either inconvenient or inappropriate to vary the aperture column-to-column spacing as taught in the above-identified Morrell patent. The system of the present invention provides an alternative which permits use of a shadow mask having substantially greater curvature than its associated faceplate.

SUMMARY OF THE INVENTION

The improved color display system, according to the present invention, includes a cathode-ray tube and a magnetic deflection yoke positioned on the tube. The tube includes a faceplate having a phosphor screen thereon; a shadow mask adjacent to the screen; and an electron gun for generating three electron beams, a center beam and two side beams, and directing the beams along paths through the yoke toward the mask and screen. The yoke forms a magnetic deflection field for scanning the electron beams in horizontal lines across the screen. The improvement comprises the combination of two features. First, the mask has greater curvature than the faceplate, with the spacing between the mask and screen increasing from the center to the sides of the mask in the horizontal scan direction. Second, means are included for dynamically varying the spacing between the side beams and the center beam in inverse relation to the variation in mask-to-screen spacing, during each horizontal scan line of the electron beams.

BRIEF DESCRIPTION OF THE DRAWINGS

FIG. 2 is a partially cutaway axial section side view of the electron gun shown in dashed lines in FIG. 1.

FIG. 3 is an end view of the electron gun and magnetic coils taken at line 3—3 of FIG. 1.

FIG. 8 is a partially cutaway axial section side view of the electron gun shown in dashed lines in FIG. 7.

DESCRIPTION OF THE PREFERRED EMBODIMENTS

Figure 1:
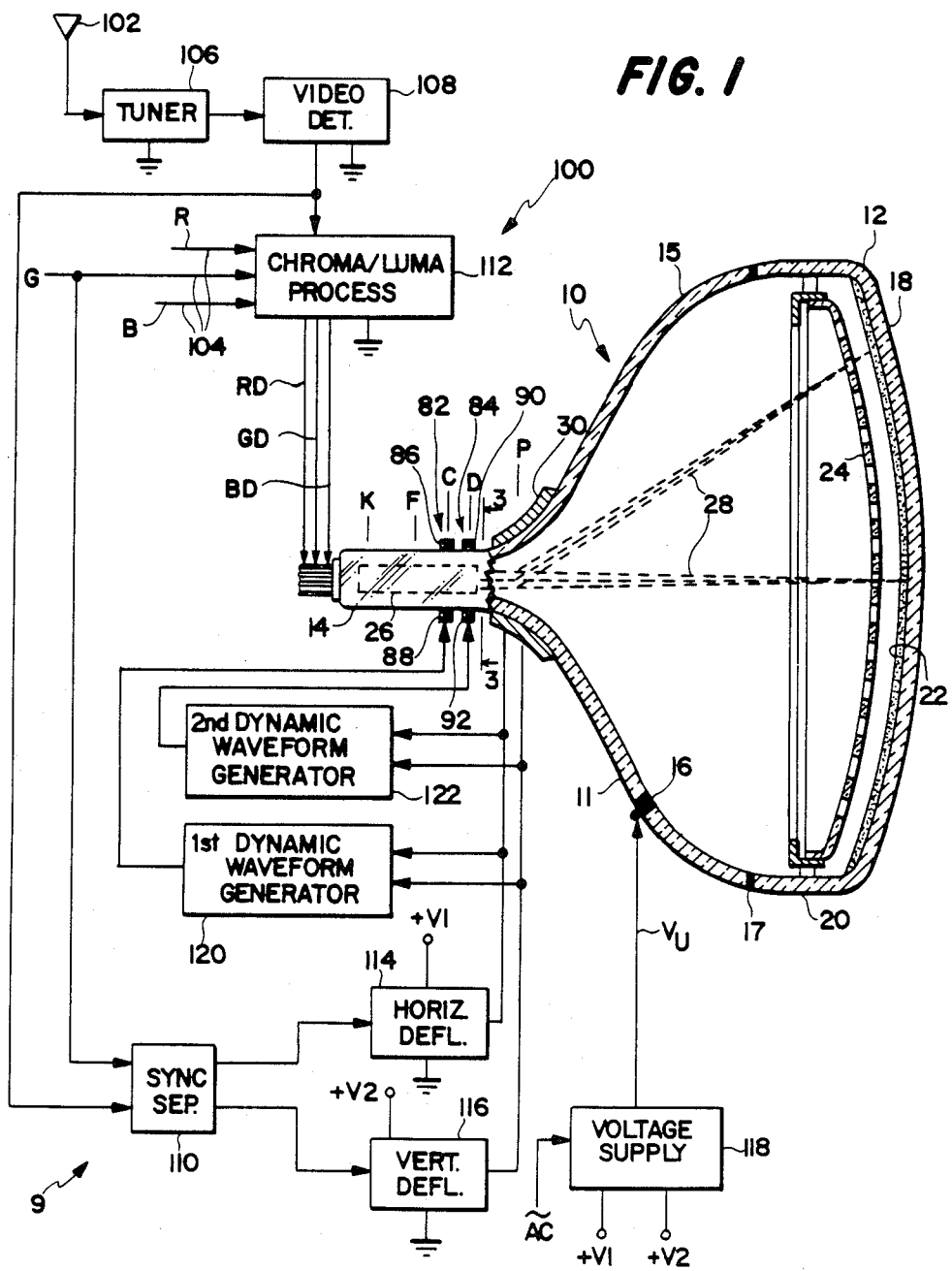
FIG. 1 is a plan view, partly in axial section, of a color display system embodying the invention.

FIG. 1 shows a color display system 9, including a rectangular color picture tube 10 having a glass envelope 11 comprising a rectangular faceplate panel 12 and a tubular neck 14 connected by a rectangular funnel 15. The funnel 15 has an internal conductive coating (not shown) that extends from an anode button 16 to the neck 14. The panel 12 comprises a viewing faceplate 18 and a peripheral flange or sidewall 20, which is sealed to the funnel 15 by a glass frit 17. A three-color phosphor screen 22 is carried by the inner surface of the faceplate 18. The screen 22 preferably is a line screen with the phosphor lines arranged in triads, each triad including a phosphor line of each of the three colors. Alternatively, the screen can be a dot screen. A multi-apertured color selection electrode or shadow mask 24 is removably mounted, by conventional means, in predetermined spaced relation to the screen 22. An electron gun 26, shown schematically by dashed lines in FIG. 1, is centrally mounted within the neck 14, to generate and direct three electron beams 28 along convergent paths through the mask 24 to the screen 22.

The tube of FIG. 1 is designed to be used with an external magnetic deflection yoke, such as the yoke 30 shown in the neighborhood of the funnel-to-neck junction. When activated, the yoke 30 subjects the three beams 28 to magnetic fields which cause the beams to scan horizontally and vertically in a rectangular raster over the screen 22. The initial plane of deflection (designated plane P) is at about the middle of the yoke 30. For simplicity, the actual curvatures of the deflection beam paths in the deflection zone are not shown in FIG. 1.

The faceplate 18 of the tube 10 has a substantially spherical external surface. However, a certain amount of wedging is added to the faceplate 18 so that the faceplate varies from being thinner at its center to being thicker at its periphery. Because of this added wedging, the interior surface of the faceplate 18 differs in contour from the exterior surface. The general shape of the shadow mask 24 is nonspherical, with the curvature along the central horizontal axis of the mask 24 being substantially greater than the corresponding curvature of the faceplate 18.

The details of the electron gun 26 are shown in FIG. 2. The gun 26 comprises three spaced inline cathodes 34 (one for each beam, only one being shown), a control grid electrode 36 (G1), a screen grid electrode 38 (G2), a first main focusing lens electrode 40 (G3) and a second main focusing lens electrode 42 (G4), spaced in the order named. Each of the G1 through G4 electrodes has three inline apertures located therein to permit passage of three electron beams The electrostatic main focusing lens in the gun 26 is formed by the facing portions of the G3 electrode 40 and the G4 electrode 42. The G3 electrode 40 is formed with four cup-shaped elements 44, 46, 48 and 50. The open ends of two elements, 44 and 46, are attached to each other, and the open ends of the other two elements, 48 and 50, are attached to each other. Although the G3 electrode 40 is shown as a four-piece structure, it could be fabricated from any number of elements to attain the same or any other desired length. The G4 electrode 42 is cup-shaped and similar, although not identical, to the element 50 of the G3 electrode 40. The open end of the G4 electrode 42 is closed by an apertured plate 52. A shield cup 53 is attached to the plate 52.

The facing portions of the G3 electrode 40 and the G4 electrode 42 are similar in construction, in that they include peripheral rims 54 and 56, respectively, and apertured portions set back in large recesses 58 and 60, respectively, from the rims. The rims 54 and 56 are the closest portions of the two electrodes 40 and 42 to each other and have the predominant effect on forming the main focusing lens.

All of the electrodes of the gun 26 are either directly or indirectly connected to two insulative support rods 62. The rods 62 may extend to and support the G1 electrode 36 and the G2 electrode 38, or these two electrodes may be attached to the G3 electrode 40 by some other insulative means. Preferably, the support rods are of glass which has been heated and pressed onto claws extending from the electrodes, to embed the claws in the rods.

The shield cup 53 has a cylindrical sidewall and a flat apertured bottom. Located within the shield cup 53 are two sets 64 and 66 of magnetically permeable members, also called pole pieces. The first set 64 includes two pairs of parallel pole pieces 68 and 70 (only one of which pairs is shown in FIG. 2) located at a longitudinal position designated "C" in FIG. 2. The second set 66 also includes two pairs of pole pieces 72, 74, 76 and 78, as shown in FIGS. 2 and 3, that are located at a longitudinal position "D" in FIG. 2. The pole pieces in each pair are located on opposite sides of a side beam path. Each pole piece includes a flange 80 that extends outside the shield cup 53.

The pole piece sets 64 and 66 are each part of magnetic deflection devices 82 and 84, respectively, each of which also includes two magnetic deflection coils: 86 and 88, in the device 82; and 90 and 92, in the device 84. The deflection coil 90 is positioned to couple its magnetic field with the two pole pieces 72 and 74, and the deflection coil 92 couples its magnetic field with the two pole pieces 76 and 78, as shown in FIG. 3. Similarly, the deflection coil 86 is positioned to couple its magnetic field with the pole pieces 68 and 70 shown in FIG. 2, and the deflection coil 88 couples its field with the other two pole pieces not shown.

Figure 4:
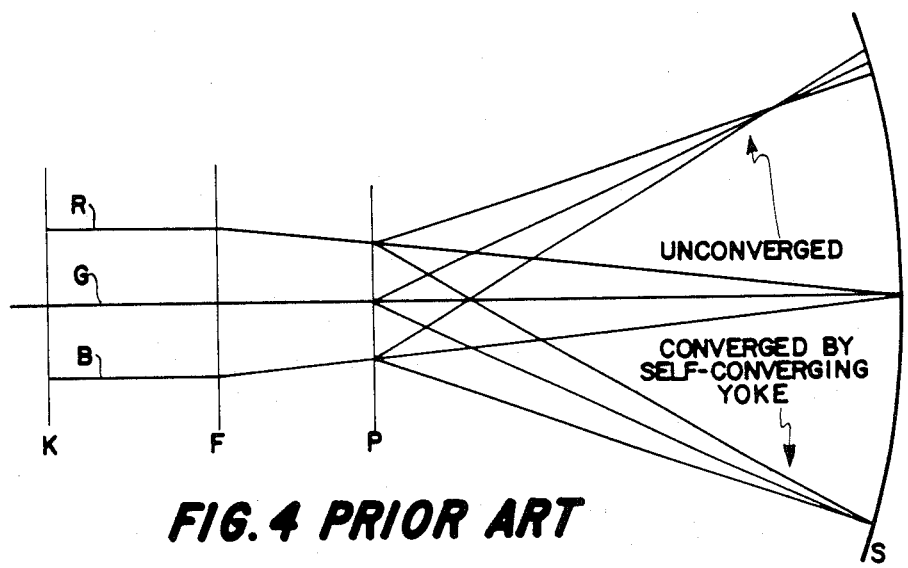
FIGS. 4 and 5 are schematic plan views showing the electron beam paths in prior art tubes.

FIG. 4 shows the paths of the red "R", green "G" and blue "B" electron beams in a prior art tube. The line labelled "K" represents the plane of the cathodes. The line labelled "F" represents the center plane of the main focus lenses. The line labelled "P" represents the deflection plane at the yoke. The curved line "S" represents the tube screen. Initially, the three beams R, G and B are coplanar and parallel to each other. The main focus lenses for the two side beams R and B each have slight asymmetries designed into them, to cause the two side beams to converge with the center beam G at the screen S. The beams also are shown deflected to two locations on the screen S. The lower position represents the paths that the beams take when deflected with a self-converging yoke, and the upper position represents the paths that the beams take when deflected with a nonself-converging yoke. As can be seen, the self-converging yoke maintains the convergence of the beams at the screen as they are deflected, whereas the beams cross-over in front of the screen when deflected with a nonself-converging yoke.

Figure 5:
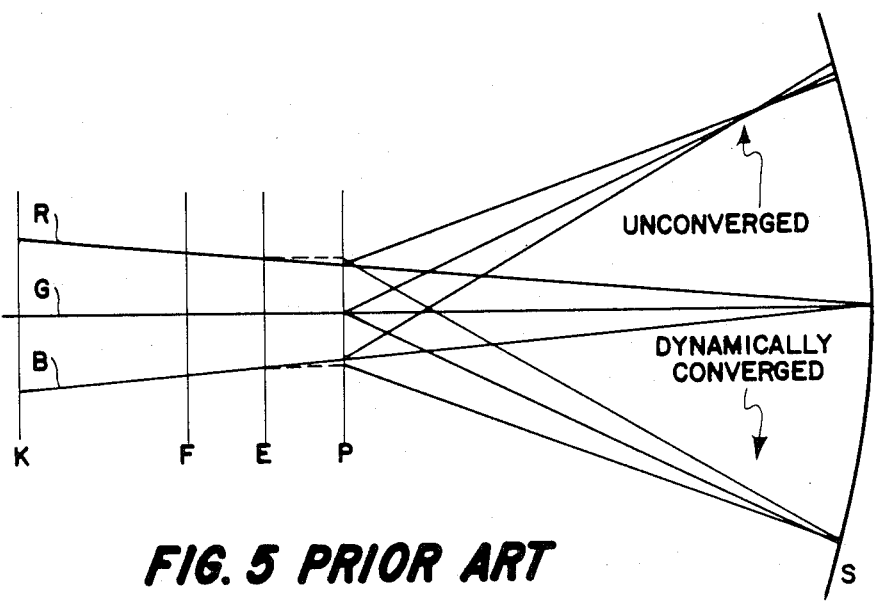

Prior to the introduction of self-converging yokes, it was necessary to provide means for dynamically converging the electron beams FIG. 5 shows the electron beam paths in a prior art system that utilizes dynamic convergence. In this system, the electrodes of an electron gun for the two side beams are angled, starting at the cathode plane K, so that the side beams R and B converge with the center beam G at the screen when there is no deflection. The upper deflected beams represent paths the beams would take if no dynamic convergence were applied. A convergence device is usually located at a plane "E", between the main focus plane "F" and the deflection plane "P". The dashed lines in FIG. 5 between plane "E" and plane "P" represent the dynamically altered side beam paths necessary for convergence of the deflected beams. The deflected beam paths of the dynamically converged beams are shown in the lower portion of the drawing. As can be seen in FIG. 5, the side beams R and B are diverged at the plane "E" to achieve convergence of the deflected beams at the screen "S". This divergence causes the electron beams to have greater beam-to-beam spacing (also called s-spacing) at the deflection plane.

Figure 6:
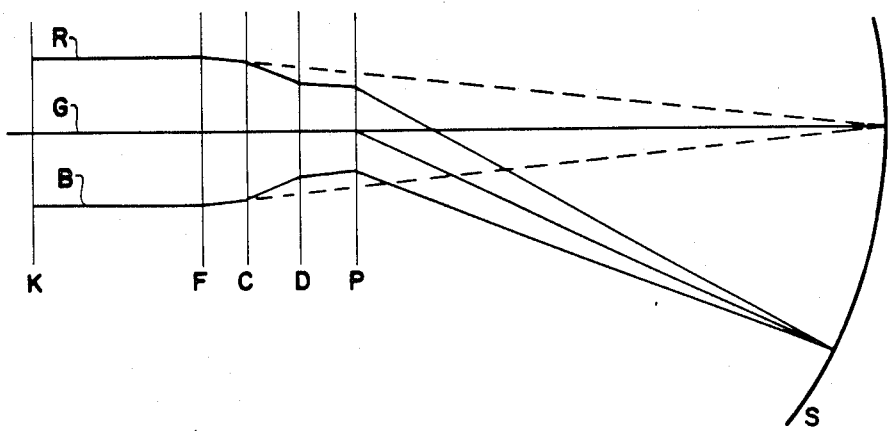
FIG. 6 is a schematic plan view showing the electron beam paths in the system of FIG. 1.

FIG. 6 shows the electron beam paths R, G and B for the novel system of FIG. 1. Initially, the three beams are coplanar and parallel to each other. At the plane "F" of the main focus lens, the side beams R and B are converged toward the center beam G so that they follow the paths shown by the dashed lines to converge the three beams at the screen "S". When the electron beams are deflected, a voltage is applied to the deflection device 82 at position "C", to cause the two side beams R and B to deflect toward or converge toward the center beam G. Simultaneously, another voltage is applied to the deflection device 84 at position "D", to cause the two outer beams R and B to deflect away or diverge from the center beam G. In this embodiment, the device 82 is used to decrease the beam-to-beam spacing or s-spacing at the deflection plane "P", and the device 84 is used to provide a dynamic convergence adjustment. Unlike the prior art system of FIG. 5, which increases beam-to-beam spacing at the deflection plane for increasing deflection angles, the novel system decreases beam-to-beam spacing for increasing deflection angles.

Referring back to FIG. 1, there is shown a portion of the electronics 100 that may operate the system as a television receiver or as a computer monitor. The electronics 100 is responsive to broadcast signals received via an antenna 102, and to direct red, green and blue (RGB) video signals via input terminals 104. The broadcast signal is applied to tuner and intermediate frequency (IF) circuitry 106, the output of which is applied to a video detector 108. The output of the video detector 108 is a composite video signal that is applied to a synchronizing signal (sync) separator 110 and to a chrominance and luminance signal processor 112. The sync separator 110 generates horizontal and vertical synchronizing pulses that are applied, respectively, to horizontal and vertical deflection circuits 114 and 116. The horizontal deflection circuit 114 produces a horizontal deflection current in a horizontal deflection winding of the yoke 30, while the vertical deflection circuit 116 produces a vertical deflection current in a vertical deflection winding of the yoke 30.

Alternatively to receiving the composite video signal from the video detector 108, the chrominance and luminance signal processing circuit 112 may receive individual red, green and blue video signals from a computer, via the terminals 104. Synchronizing pulses may be supplied to the sync separator 110 via a separate conductor or, as shown in FIG. 1, by a conductor from the green video signal input. The output of the chrominance and luminance processing circuitry 112 comprises the red, green and blue color drive signals, which are applied to the electron gun 26 of the cathode ray tube 10 via conductors RD, GD and BD, respectively.

Power for the system is provided by a voltage supply 118, which is connected to an AC voltage source. The voltage supply 118 produces a regulated DC voltage level $+V_1$ that may, illustratively, be used to power the horizontal deflection circuit 114. The voltage supply 118 also produces DC voltage $+V_2$ may be used to power the various circuits of the electronics, such as the vertical deflection circuit 116. The voltage supply further produces a high voltage $V_u$ that is applied to the ultor terminal or anode button 16.

Circuits and components for the tuner 106, video detector 108, sync separator 110, processor 112, horizontal deflection circuit 114, vertical deflection circuit 116 and voltage supply 118 are well known in the art and therefore not specifically described herein.

In addition to the elements noted above, the electronics 100 includes two dynamic waveform generators 120 and 122. The waveform generators 120 and 122 provide the dynamically varied voltages for the deflection devices 82 and 84, respectively.

The generators 120 and 122 receive the horizontal and vertical scan signals from the horizontal deflection circuit 114 and the vertical deflection circuit 116, respectively. The circuitry for the waveform generators 120 and 122 may be that known from, for example: U.S. Pat. No. 4,214,188, issued to Bafaro et al., on July 22, 1980; U.S. Pat. No. 4,258,298, issued to Hilburn et al., on Mar. 24, 1981; and U.S. Pat. No. 4,316,128, issued to Shiratsuchi on Feb. 16, 1982. These patents are hereby incorporated by reference, for their showings of such dynamic circuitry.

The required dynamic voltage signal is at a maximum when the electron beams are deflected to a screen corner, and is zero when the beams are at a screen center. As the beams are scanned horizontally along each raster line, the dynamic voltage signal is varied from high-to-low-to-high- in a form that is related to the mask-to-screen spacing. As the beams are deflected vertically, the dynamic voltage signal also is varied from high-to-low-to-high- so that the waveforms applied to each adjacent horizontal line are slightly different. The particular signal utilized also depends upon the design of the yoke that is used.

Figure 7:
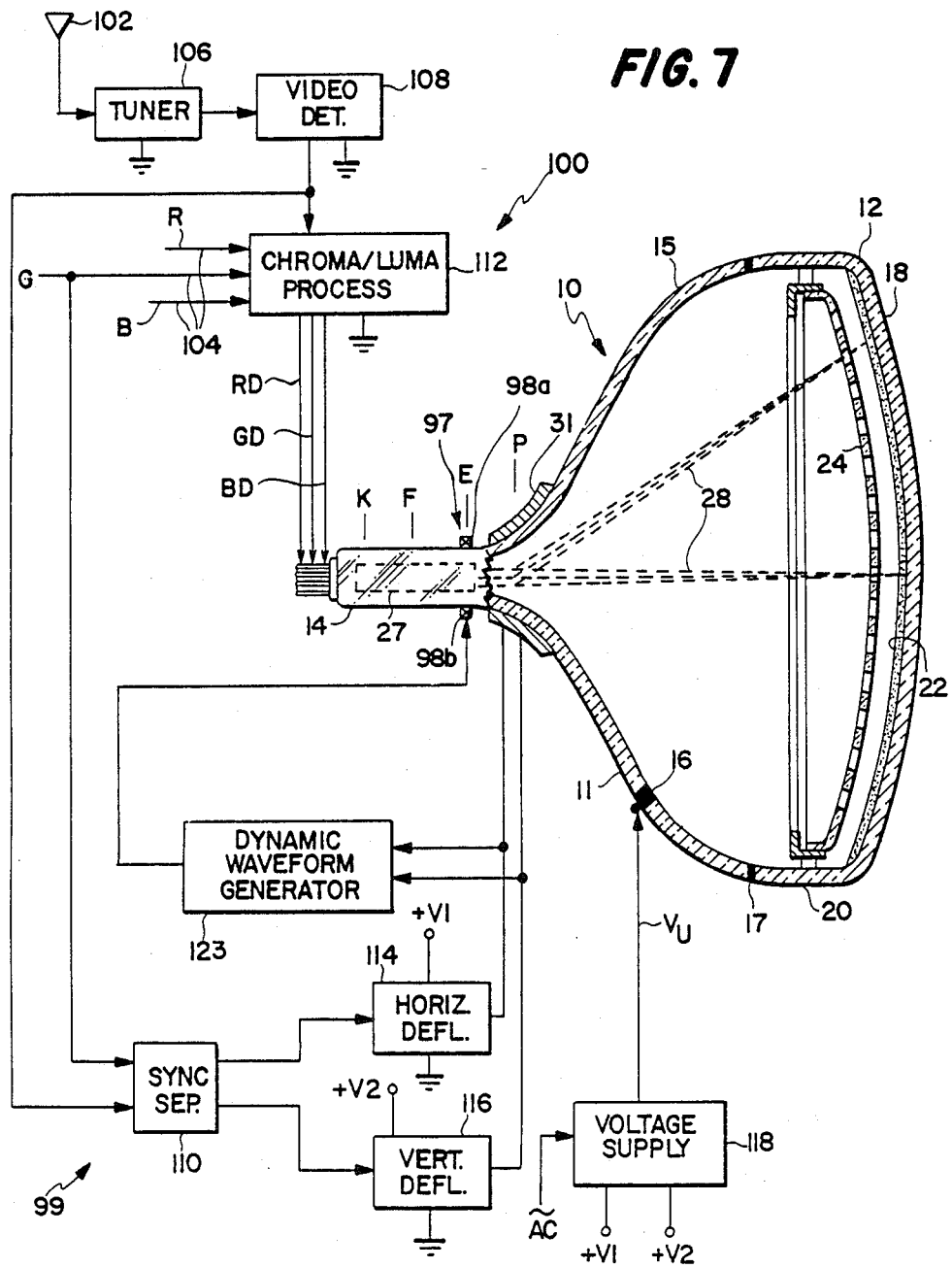
FIG. 7 is a plan view, partly in axial section, of another color display system embodying the invention.

FIG. 7 shows another color display system 99. This system 99 is similar to the system 9 of FIG. 1. Therefore, the same numerical identifications are used for similar components, and new identifications are provided only for components in the system 99 that are significantly different than the corresponding components in the system 9. These different components are a modified electron gun 27 (shown in detail in FIG. 8), a self-converging yoke 31, a magnetic deflecting device 97 and a dynamic waveform generator 123.

The electron gun 27, shown in FIG. 8, is identical to the electron gun 26 of FIG. 2, except that the electron gun 27 has only one set 94 of pole pieces, located at a position labelled "E". The set 94 includes two pairs of parallel pole pieces 95 and 96 (only one of which pairs is shown in FIG. 8). The pole piece set 94 is part of the magnetic deflection device 97 that also includes two magnetic deflection coils 98a and 98b, shown in FIG. 7. The coils are activated by a voltage signal from the dynamic waveform generator 123.

Figure 9:
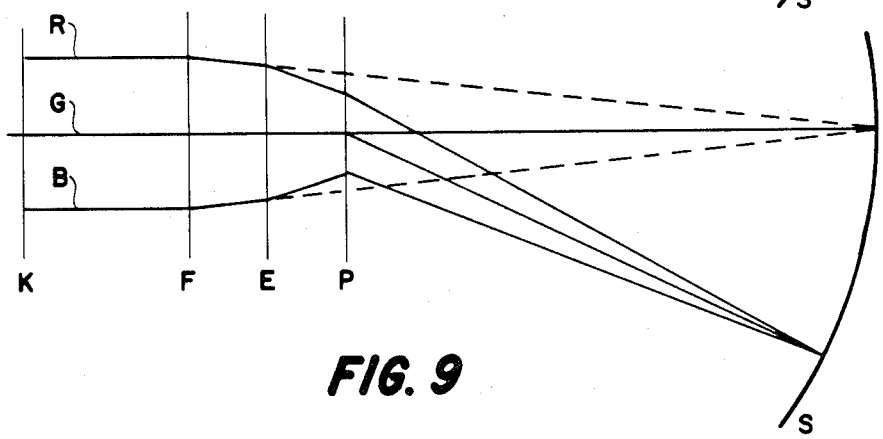
FIG. 9 is a schematic plan view showing the electron beam paths in the system of FIG. 7.

FIG. 9 shows the electron beam paths R, G and B for the novel system of FIG. 7. The three beam paths are coplanar and parallel, from the cathode plane "K" to the main focus lens plane "F". At the main focus lens plane "F", the side beams R and B are slightly deflected to converge the three beams at the screen "S". When the electron beams are deflected, a voltage is applied to the coils 98 and 99, which causes the side beams R and B to be deflected at the plane "E" toward the center beam G. This deflection reduces the beam-to-beam or s-spacing at the deflection plane in relation to deflection angle of the electron beams caused by the yoke 30.

General Considerations

In the above-described embodiments, the mask-to-screen spacing or "q-spacing" increases from the center of the mask to the sides of the mask. Generally, to obtain a doming advantage, the q-spacing ratio from the sides to the center of the mask should be greater than 1.15, as taught by previously cited U.S. Pat. No. 4,136,300. However, in a 25V (63.5 cm diagonal) tube, a side-to-center q-spacing ratio of about 1.5 is preferred. In U.S. Pat. No. 4,136,300, the greater q-spacing ratio was previously achieved by permitting the aperture column-to-column spacing "a" to vary in relation to the variation of the "q"-spacing to maintain the equation q=La/3s. With the present invention, the beam-to-beam spacing "s" is varied inversely with the variation in "q"-spacing to maintain the equation q=La/3s. However, it should be understood that the variation in "s"-spacing need not be directly inverse to the variation in "q"-spacing, and that "a"-spacing may also be varied to some extent to partially compensate for the "q"-spacing variation.

In the above-described embodiments, the faceplates are shown as having substantially spherical exterior contours. A system embodying the present invention need not be limited to spherical contours, but may also use cylindrical, biradial or other more complex faceplate contours.

In the system 9 of FIG. 1, the yoke 30 preferably is a nonself-converging yoke. The yoke 31 in the system 99 of FIG. 7 is a self-converging yoke. However, the yoke 30 of the system 9 could, in an alternative, be a self-converging yoke, wherefore the deflection device 84 would be utilized to adjust the incident angle of the side beams at the deflection plane.

Reference herein has been made to vertical and horizontal deflection. Such reference relates to a tube positioned with its faceplate vertical. In a rectangular tube, the horizontal direction is that which parallels the long dimension of a faceplate, and the vertical direction parallels the shorter dimension. Of course, the present invention applies to systems having tubes in other orientations, such as used in projection systems.

What is claimed is:

1. In a color display system including a cathode-ray tube and a magnetic deflection yoke positioned on said tube, said tube including a faceplate having a phosphor screen thereon, a shadow mask adjacent to said screen, and an electron gun for generating three electron beams, a center and two side beams, and directing said beams along paths through said yoke toward said mask and screen, said yoke forming a magnetic deflection field for scanning said electron beams vertically and in horizontal lines across said screen, the improvement comprising said mask having greater curvature than said faceplate, with the spacing between said mask and screen increasing from the center to the sides of said mask in the horizontal scan direction, and
   means for dynamically varying the spacing between the side beams and the center beam in inverse relation to the variation in mask-to-screen spacing during each horizontal scan line of the electron beams.

2. The system as defined in claim 1, wherein said means for varying beam spacing includes two separate deflection devices spaced along the electron beam paths, each device comprising magnetically permeable members positioned on opposite sides of each of the side beam paths and magnetic field forming coils positioned to couple with said members.

3. The system as defined in claim 1, wherein said means for varying beam spacing includes two separate deflection devices spaced along the electron beam paths, a first of said devices located furthest from said screen having means for converging the side beams toward the center beam, and the second of said devices being located between said first device and said yoke and having means for diverging the side beams away from the center beam.

4. The system as defined in claim 1, wherein said means for varying beam spacing includes a single deflection device comprising magnetically permeable members, positioned on opposite sides of each of the side beam paths, and magnetic field forming coils positioned to couple with said members.

5. In a color display system including a cathode-ray tube and a magnetic deflection yoke positioned on said tube, said tube including a faceplate having a phosphor screen thereon, a shadow mask adjacent to said screen, and an electron gun for generating three electron beams, a center and two side beams, and directing said beams along paths through said yoke toward said mask and screen, said yoke forming a magnetic deflection field for scanning said electron beams vertically and in horizontal lines across said screen, the improvement comprising said mask having greater curvature than said faceplate, with the spacing between said mask and screen increasing from the center to the sides of said mask in the horizontal scan direction, the ratio of mask-to-screen spacing at the sides of the mask to the center of the mask being at least 1.15, and
   means for dynamically varying the spacing between the side beams and the center beam in inverse relation to the variation in mask-to-screen spacing during each horizontal scan line of the electron beams, to maintain the equation q=La/3s, where: q is the mask-to-screen spacing, L is the distance from a plane of deflection, a is the center-to-center spacing between aperture columns, and s is the center-to-center beam spacing at the plane of deflection.

* * * * *